(12) United States Patent
Watanabe et al.

(10) Patent No.: US 6,915,883 B2
(45) Date of Patent: Jul. 12, 2005

(54) ELECTRIC BRAKING APPARATUS

(75) Inventors: Jun Watanabe, Tokyo-to (JP); Takuya Usui, Yokohama (JP); Hirotaka Oikawa, Yokohama (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/209,836

(22) Filed: Jul. 30, 2002

(65) Prior Publication Data

US 2003/0066719 A1 Apr. 10, 2003

(30) Foreign Application Priority Data

Jul. 31, 2001 (JP) .......................... 2001-232640
Jan. 31, 2002 (JP) .......................... 2002-024491

(51) Int. Cl.$^7$ .............................................. F16D 65/36
(52) U.S. Cl. ...................... 188/156; 188/162; 188/71.9; 188/72.1; 188/265; 188/69
(58) Field of Search ................................ 188/156, 157, 188/158, 265, 72.8, 162, 68, 69, 72.7, 72.1, 71.9; 310/12, 13, 14, 91

(56) References Cited

U.S. PATENT DOCUMENTS

| | | | |
|---|---|---|---|
| 5,148,894 A | * | 9/1992 | Eddy, Jr. .................... 188/72.6 |
| 5,348,123 A | | 9/1994 | Takahashi et al. |
| 5,954,162 A | * | 9/1999 | Feigel et al. ................ 188/72.6 |
| 6,173,820 B1 | * | 1/2001 | Blosch et al. ................ 188/158 |
| 6,267,207 B1 | * | 7/2001 | Fleischer et al. ............ 188/162 |
| 6,305,511 B1 | * | 10/2001 | McCann et al. ............. 188/265 |
| 6,315,092 B1 | * | 11/2001 | Schwarz ....................... 188/265 |
| 6,561,321 B1 | * | 5/2003 | Klode et al. ................ 188/72.1 |
| 6,626,270 B2 | * | 9/2003 | Drennen et al. ............ 188/72.1 |

* cited by examiner

*Primary Examiner*—Matthew C. Graham
*Assistant Examiner*—Mariano Sy
(74) *Attorney, Agent, or Firm*—Brinks Hofer Gilson & Lione

(57) ABSTRACT

An electric braking apparatus is disclosed in which a rotational movement from a motor is converted into linear movement that moves a brake piston to generate braking force. The electric brake apparatus can perform full parking brake function without sacrificing its original braking function. In operation, immediately after generation of braking force caused by rotation of the rotor (26) supply of electricity to the motor is turned off. After supply of electricity is turned off, however, the rotor (26) is restricted from returning to its original position due to an engagement with an engaging claw (54) via a claw wheel (50), thereby keeping the barking brake remain effective. When electricity is thereafter supplied to the motor, the rotor (26) generates rotational torque sufficiently strong to push down the engaging claw (54) for disengagement, thereby releasing the parking brake.

20 Claims, 18 Drawing Sheets

ELECTRIC BRAKING APPARATUS

BACKGROUND OF THE INVENTION

The present invention relates to an electric braking apparatus for producing braking force by torque of a motor, and particularly to an electric braking apparatus added with a parking brake function.

There are currently electric braking apparatuses with a caliper comprising a piston, a motor and a rotation-linear movement conversion mechanism for converting rotation of the motor into linear movement. In such an electric braking apparatus, the piston is moved in accordance with rotation of a rotor of the motor to thereby press a brake pad against a disk rotor and produce braking force. Further, such an electric braking apparatus normally has a sensor for detecting pressing force or a stroke distance of a brake pedal depressed by an operator and controls the amount of the rotation (a rotational angle) of the electric motor in accordance with the detection results detected by the above sensor to thereby achieve the desired braking force.

However, in recent times, there have been various attempts made to enhance the functionality of an electric braking apparatus of this kind by adding the parking brake function. For example, U.S. Pat. No. 5,348,123 and corresponding German Patent Laid-open No. (Offenlegungsschrift) DE4229042A1 have proposed a mechanical brake operating mechanism in which a rotating shaft is connected to a pivoting member of the rotation-linear movement conversion mechanism described above via a clutch mechanism and a ball ramp mechanism. A rotational force is exerted on the rotational shaft from the outside by an operation of, for example, a lever, to engage the clutch via the ball ramp mechanism, thereby placing the rotation-linear movement conversion mechanism in operation to produce braking force.

However, in the mechanical brake operating mechanism described in the above publications, when the brake pedal is depressed while the parking brake is made effective by the operation from the outside, the problem arises that since the rotation-linear movement conversion mechanism is operationally connected to the outside operating portion via the clutch mechanism, the electric brake does not operate. Further, it is also a problem that since the rotating shaft is connected in series to the pivoting member of the rotation-linear movement conversion mechanism via the clutch mechanism and the ball ramp mechanism, the caliper is elongated in the axial direction. Therefore, the mechanical brake operating mechanism may not be suited for all vehicles due to possible interference with the wheel.

The invention has been made in view of the above-described technical background. It is a purpose thereof to provide an electric braking apparatus equipped with a parking brake function that does not interfere with the normal braking operation of the braking apparatus. It is still another purpose thereof to provide an electric braking apparatus that can be mounted on any vehicles.

SUMMARY OF THE INVENTION

In order to resolve the above-described problem, according to an aspect of the invention, there is provided an electric braking apparatus with a caliper comprising a piston, a motor and a rotation-linear movement conversion mechanism for converting rotation of the motor into linear movement and transmitting the linear movement to the piston, so that the piston is moved in accordance with the rotation of a rotor of the motor to press a brake pad against a disk rotor to generate braking force, wherein a parking brake locking mechanism is arranged around the rotor, which functions to restrict rotation of the rotor in the brake releasing direction when no electricity is supplied to the motor and to release the restriction on the rotor in accordance with the amount of electricity supplied to the motor.

In the electric braking apparatus according to such constitution, when electricity supplied to the motor is cut after braking force caused by rotation of the rotor of the motor has been generated, the parking brake locking mechanism operates to restrict rotation of the rotor, the braking force is maintained and the parking brake thus carries out its function. Under this condition, when a supply of electricity to the motor begins, the rotor begins to rotate, so that the parking brake locking mechanism unlocks and the parking brake is automatically released. Further, the parking brake locking mechanism is arranged around the rotor and therefore, the length of the caliper in the axial direction is not enlarged.

DETAILED DESCRIPTION OF THE INVENTION

A detailed explanation will be given of embodiments of the invention in reference to the attached drawings.

Figure 1:
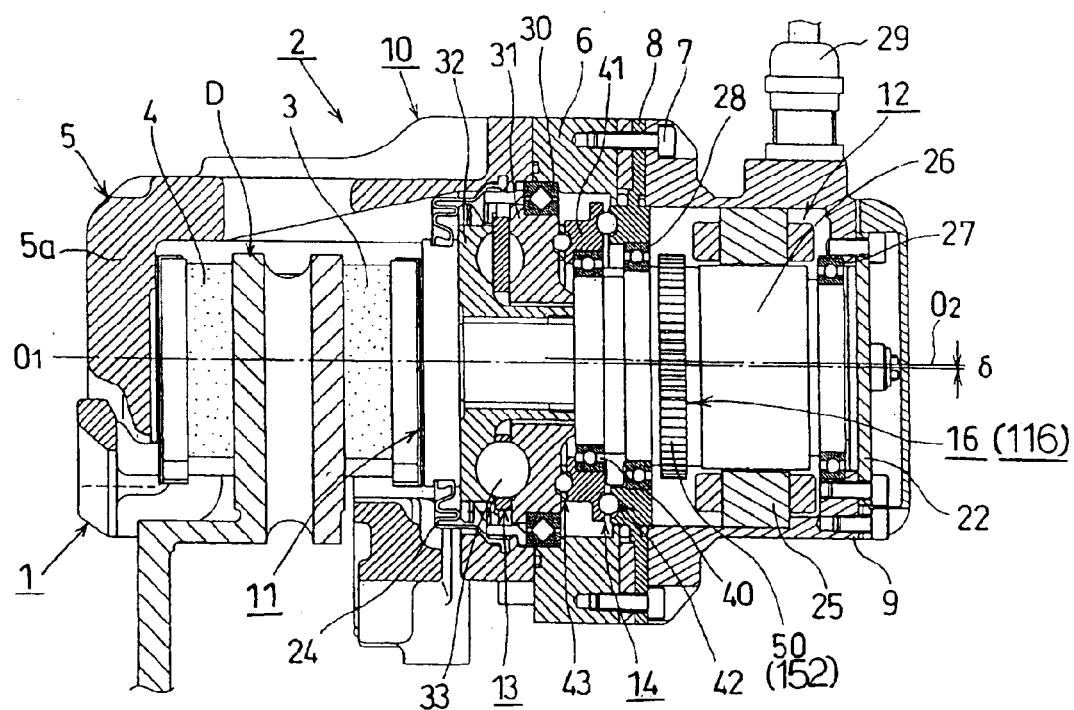
FIG. 1 is a sectional view showing the structure of an electric braking apparatus according to the invention.
Figure 2:
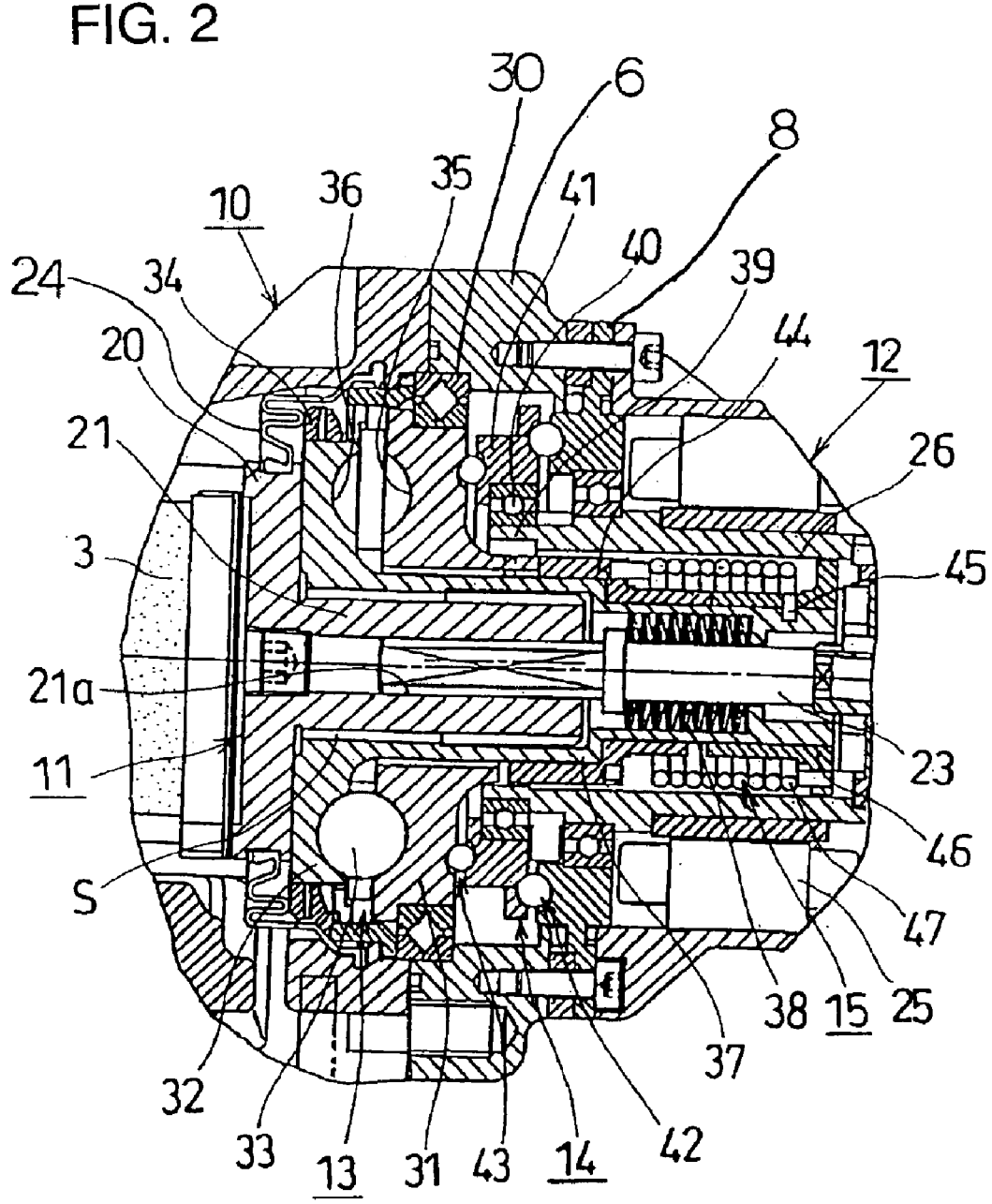
FIG. 2 is an enlarged sectional view showing a portion of the electric braking apparatus.
Figure 3:
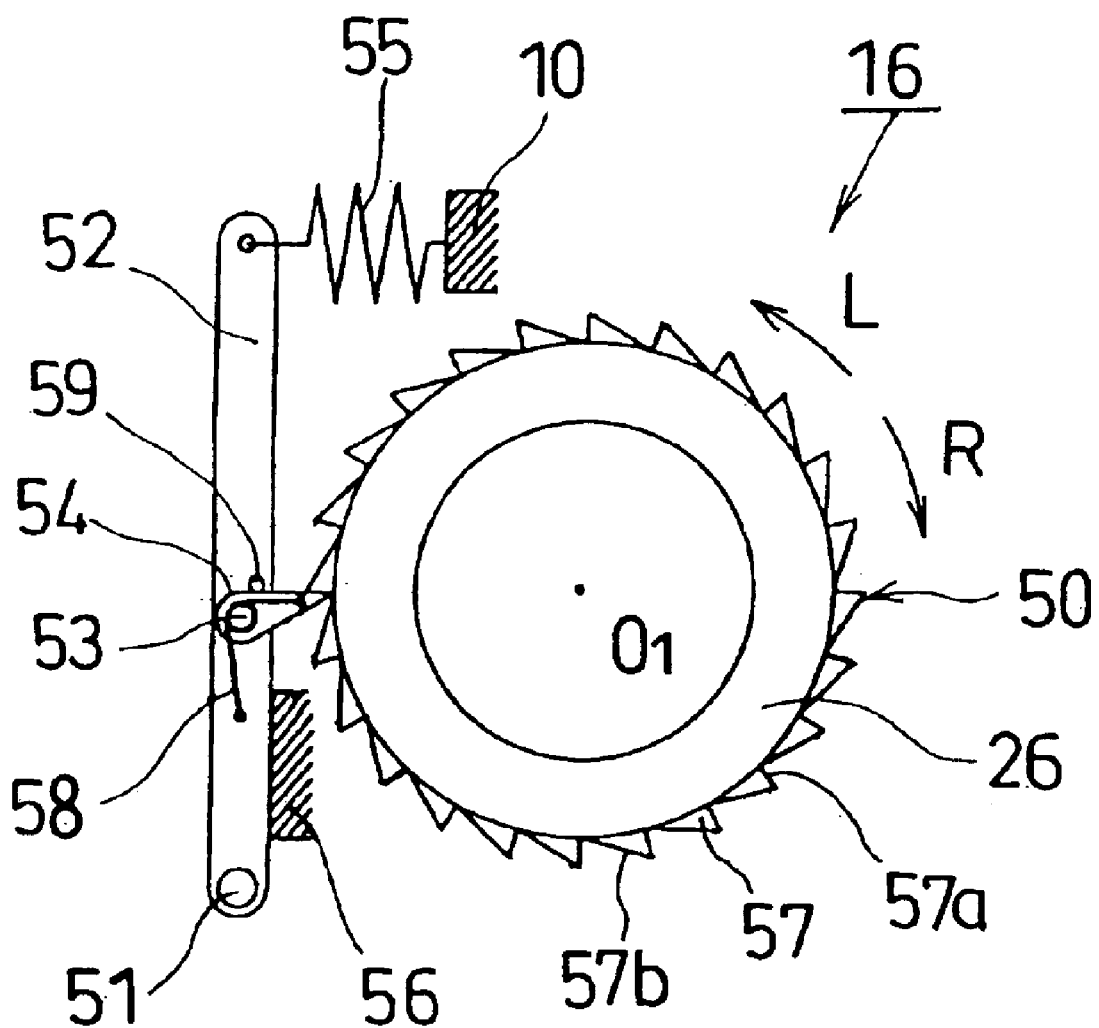
FIG. 3 is a schematic view showing the structure of a parking brake locking mechanism according to a first embodiment of the invention.

FIGS. 1 through 3 show an electric braking apparatus according to a first embodiment of the invention. In these drawings, numeral 1 designates a carrier fixed to a nonrotational portion (a knuckle or the like) of a vehicle, which carrier is disposed further inside the vehicle than a disk rotor D; numeral 2 designates a caliper floatably supported by the carrier 1 in the axial direction of the disk rotor D; numerals 3 and 4 designate a pair of brake pads arranged on both sides of the disk rotor D. The brake pads 3 and 4 are supported by the carrier 1 so that they can move in the axial direction of the disk rotor D. The caliper 2 includes a caliper main body 10 having a claw member 5 with a claw portion 5a at the front end, an annular base member 6 coupled to the base of the claw member 5 by means of bolts (not illustrated), an annular support plate 8 coupled to the base member 6 by means of bolts 7, and a motor case 9. The claw portion 5a of the claw member 5 is arranged proximately to the back face of the brake pad 4, which is located outward of the vehicle.

According to the embodiment, inside the caliper 2, there are arranged a piston 11 capable of abutting against the back face of the brake pad 3 facing the interior of the vehicle; a motor 12; a ball ramp mechanism (a rotation-linear movement conversion mechanism) 13 for converting rotational movement outputted from the motor 12 into linear movement and transmitting the linear movement to the piston 11; a differential speed reducing mechanism 14 for reducing the rotation speed of the motor 12 and transmitting the rotation to the ball ramp mechanism 13; a pad wear compensating mechanism 15 (FIG. 2) which adjusts the position of the piston 11 in accordance with wear of the brake pads 3 and 4; and a parking brake locking mechanism 16 (FIGS. 1 and 3) which serves as a parking brake.

As shown by FIG. 2, the piston 11 includes a main body portion 20 with a large diameter and a shaft portion 21 with a small diameter. The main body portion 20 is arranged proximately to the brake pad 3 toward the interior of the vehicle. The shaft portion 21 of the piston 11 is formed with a shaft hole 21a having a square cross-section. The piston 11 is axially slidably but nonrotatably supported by a support rod 23 in such a manner that the shaft hole 21a is inserted with the front end portion of the support rod 23, which is extended from the end plate 22 of the motor case 9. Further, a cover 24 made of rubber for sealing the inside of the caliper main body 10 from the outside is provided between the main body portion 20 of the piston 11 and the caliper main body 10.

The motor 12 is provided with a stator 25 fixedly fitted in the motor case 9. A hollow rotor 26 is arranged inside the stator 25. The rotor 26 is pivotally supported by the motor case 9 and the support plate 8 through bearings 27 and 28. With the instruction from a controller (not illustrated), the motor 12 is operated to rotate the rotor 26 with desired torque and over desired angle. The rotational angle of the rotor 26 is detected by a rotation detector, not illustrated, arranged inside the rotor 26. Further, the caliper main body 10 is attached with a connector 29 for dealing with a signal line that connects the stator 25 and the rotation detector and the controller.

The ball ramp mechanism 13 is provided with a ring-shaped first disk (a pivoting member) 31 pivotally supported by the inner periphery of the annular base member 6 of the caliper main body 10 via a cross roller bearing 30, a ring-shaped second disk (a linearly moving member) 32 coupled to the shaft portion 21 of the piston 11 via screw portion S, and three balls 33 interposed between the two disks 31 and 32. The second disk 32 is arranged to abut against the rear face of the main body portion 20 of the piston 11 and is normally restricted from rotating by friction force of a wave washer 34 interposed between the second disk 32 and the caliper main body 10.

The three balls 33 are respectively disposed between three ball grooves 35 and 36 respectively formed on respective faces of the first disk 31 and the second disk 32 facing each other along the circumference. The three ball grooves 35 and 36 are inclined in the same direction and arranged to shift axially by the same interval in the range of the same center angle (for example, 90 degrees). When the first disk 31 is rotated in the counterclockwise direction as viewed from the right in FIGS. 1 and 2, the second disk 32 is pressed to the left. At this time, rotation of the second disk 32 is restricted from rotating by the wave washer 34 and therefore moves straight forward. As a result, the piston 11 is moved forward and presses the brake pad 3 facing the interior of the vehicle to the disk rotor D.

Meanwhile, on the portion of the second disk 32 screwed to the shaft portion 21 of the piston 11 (screw portion S) is continuously provided with the extended cylindrical portion 37 greatly extended toward the end plate 22 of the motor case 9. Inside of the extended cylindrical portion 37 there is arranged disk springs 38 one of which is fixed to the support rod 23 and which normally urge the second disk 32 toward the first disk 31 via the extended cylindrical portion 37. Thereby, the balls 33 of the ball ramp mechanism 13 are strongly pressed between the two disks 31 and 32, and when the first disk 31 is rotated clockwise as viewed from the right in FIGS. 1 and 2, the second disk 32 is moved backward to the right in the drawings, which thereby separates the piston 11 from the brake pad 3.

As is well shown in FIG. 2, the differential speed reducing mechanism 14 is constituted with an eccentric shaft 39 formed at one end of the rotor 26 of the motor 12 extended toward the disk rotor D; an eccentric plate 41 mounted to fit to the eccentric shaft 39 pivotally via a bearing 40; an Oldham mechanism 42 interposed between the eccentric plate 41 and the support plate 8 of the caliper main body 10; and a cycloid ball speed reducing mechanism 43 interposed between the eccentric plate 41 and the first disk 31 of the ball ramp mechanism 13. The eccentric plate 41 dose not rotate but revolves in accordance with rotation of the eccentric shaft 39 by operation of the Oldham mechanism 42. Meanwhile, in accordance with revolving of the eccentric plate 41, the cycloid ball speed reducing mechanism 43 is operated and the first disk 31 is rotated in a direction reverse to that of the rotor 26 at a speed that is in a constant ratio to that of rotor 26. Further, in FIG. 1, notation O1 designates the rotational center of the rotor 26; notation O2 designates the rotational center of the eccentric shaft 39; and notation δ designates the amount of eccentricity.

The rotation ratio N of the first disk 31 to the rotor 26, becomes N=(D−d)/D, where d is the diameter of a reference circle of a cycloid groove on the side of eccentric plate 41 in the cycloid ball speed reducing mechanism 43 and D is the diameter of a reference circle of a cycloid groove on the side of the first disk 31. In this case, the number of rotations of the rotor 26 when the first disk 31 is rotated by one rotation is the speed reduction ratio α (=1/ N). Further, the second disk 32 is moved forward by S=(L/360)×(θ/α) where the rotor 26 is rotated by a certain angle θ; the rotational angle θA of the first disk 31 is θ/α; and L is the inclination (lead) of the ball grooves 35 and 36 of the ball ramp mechanism 13.

As is well shown in FIG. 2, the pad wear compensating mechanism 15 comprises a limiter 44 pivotally fitted to the extended cylindrical portion 37 of the second disk 32 of the ball ramp mechanism 13 and connected to the first disk 31 during operation with a clearance in the rotational direction, a spring holder 46 which is fitted to the extended tubular portion 37 of the second disk 32 and whose position is fixed relative to the second disk 32 by a pin 45, and a coil spring 47 which is arranged around the spring holder 46, one end of which is connected to the limiter 44 and other end of which is connected to the spring holder 46.

The pad wear compensating mechanism 15 functions in such a manner that, when the brake pads 3 and 4 are worn, the limiter 44 rotates in accordance with rotation of the first disk 31 of the ball ramp mechanism 13, and that that rotation is then transmitted to the second disk 32 via the coil spring 47, the spring holder 46 and the pin 45, and that the piston 11, restricted in rotation by the support pin 23, moves forward along the support pin 23 until the brake pad 3 is pressed to the disk rotor D, i.e., until the braking force is generated, so that the gap caused by the pad wear is eliminated. Meanwhile, after producing the braking force, the large friction resistance produced at the screw portion S between the piston 11 and the second disk 32 hampers rotation of the second disk 32. Therefore, rotational misalignment between the second disk 32 and the first disk 31, that is, rotational misalignment between the spring holder 46 and the limiter 44 is absorbed by twisting of the coil spring 47.

As is well shown by FIG. 3, the parking brake locking mechanism 16 includes a claw wheel 50 formed integrally with the outer peripheral face of the rotor 26 of the motor 12; a arm lever 52 which is arranged beside the claw wheel 50 and pivotally attached at its base end to the caliper main body 10 by using a pin 51; an engaging claw 54 the base end of which is pivotally attached midway along the length of the arm lever 52 by using a pin 53; a tensile spring (urging means) 55 interposed between a front end of the arm lever 52 and the caliper main body 10 for normally urging the arm lever 52 close to the claw wheel 50; and a stopper portion 56 provided on the caliper main body 10 which abuts against a side face of the arm lever 52 urged by the tensile spring 55 so that the arm lever 52 is substantially orthogonal to one of the lines through the center of the rotor 26.

Each of the tooth portions 57 of the claw wheel 50 is given a tooth shape in which a steep tooth engaging face 57a faces in direction L that the rotor 26 rotates when braking is being released (the counterclockwise direction when viewed from the right in FIG. 1), and an inclined escape face 57b faces in direction R that the rotor 26 rotates when braking is being applied (the clockwise direction when viewed from the right in FIG. 1). Further, the arm lever 52 is provided with a torsion spring 58 that normally urges the engaging claw 54 in the counterclockwise direction as viewed in FIG. 3; and a projection 59 that restricts rotation of the engaging claw 54 in the counterclockwise direction and keeps the engaging claw 54 in a direction substantially orthogonal to the arm lever 52. That is, through the combined positioning control functions provided by the arm lever 52 urged by the tensile spring 55 and the engaging claw 54 per se urged by the torsion spring 58, the end portion of the engaging claw 54 is normally positioned so as to engage with the teeth 57 of the claw wheel 50.

Figure 4:
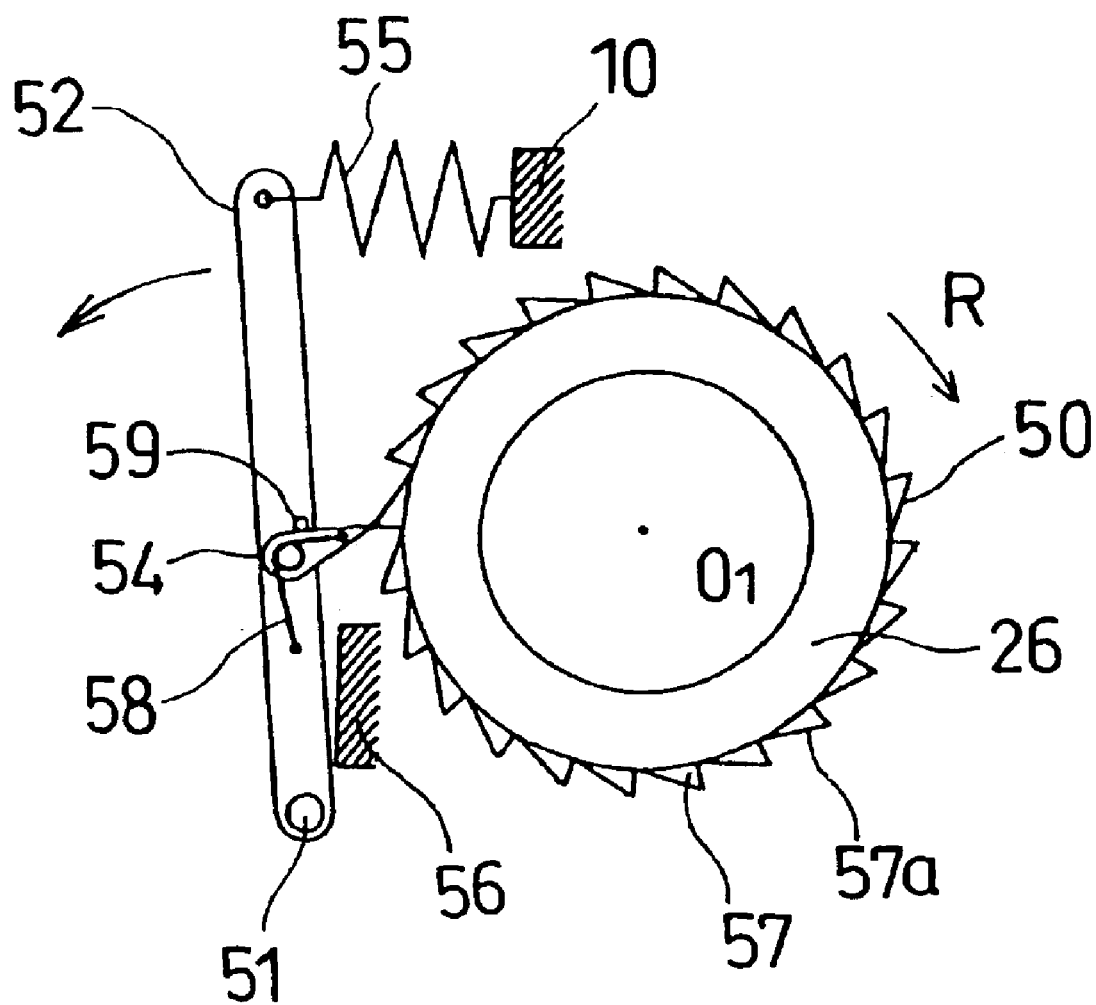
FIG. 4 is a schematic view showing the parking brake locking mechanism in operation according to the first embodiment.

An explanation will be given of operation of the electric braking apparatus according to the first embodiment also in reference to FIG. 4 and FIG. 5.
(In Operating Electric Brake)

When the apparatus is operated as a normal electric brake, the rotor 26 of the motor 12 rotates in the clockwise direction as viewed from the right in FIGS. 1 and 2 upon input of a braking signal from the driver. Then, the eccentric plate 41, since attached via the bearing 40 to the eccentric shaft 39 formed integrally with the rotor 26, revolves, not rotate, by the Oldham mechanism 42. By the revolusion of the eccentric plate 41, the cycloid ball speed reducing mechanism 43 is operated and the first disk 31 of the ball ramp mechanism 13 is rotated in the reverse direction (counterclockwise) at a speed in a constant ratio N to that of the rotor 26 as described above. Meanwhile, the rotation of the second disk 32 of the ball ramp mechanism 13 is restricted due to the resistance force by the wave washer 34. Accordingly, the second disk 32 moves forward toward the disk rotor D in accordance with rotation of the first disk 31. The piston 11 thereby moves and presses the brake pad 3 facing the interior of the vehicle to the disk rotor D. Then, by the reactive force thereon, the caliper 2 moves relative to the carrier 1. The claw portion 5a of the claw member 5 presses the brake pad 4 facing the outside of the vehicle to the outer face of the disk rotor D to thereby produce braking force in accordance with torque of the motor 12. At this time, if the brake pads 3 and 4 have been worn, the pad wear compensating mechanism 15 is operated to eliminate the gap formed by pad wear as described above.

Further, when the electric brake is operated, the claw wheel 50 of the parking brake locking mechanism 16 rotates in the clockwise direction R, along with the rotor 26. As a result, the engaging claw 54 slides along the inclined escape face 57b of a tooth portion 57 while abutting against the projection 59. Since the rotational torque of the rotor 26 is sufficiently larger than the urging force of the tensile spring 55, the arm lever 52, as shown in FIG. 4, rotates around the pin 51 counterclockwise to move away from the claw wheel 50 over the urging force of the tensile spring 55, so that the engaging claw 54 smoothly climbs over the tooth portions 57 of the claw wheel 50. That is, the rotor 26 smoothly rotates in the clockwise direction (the braking direction) R to thereby assure the functioning of the electric brake.
(In Releasing Electric Brake)

When the river releases the operation of electric brake, the rotor 26 of the motor 12 rotates counterclockwise as viewed from the right in FIGS. 1 and 2. Urged by the disk springs 38, the second disk 32 and the piston 11 move backward together to remove the pressing force on the disk rotor D and thereby release the braking force.

Figure 5:
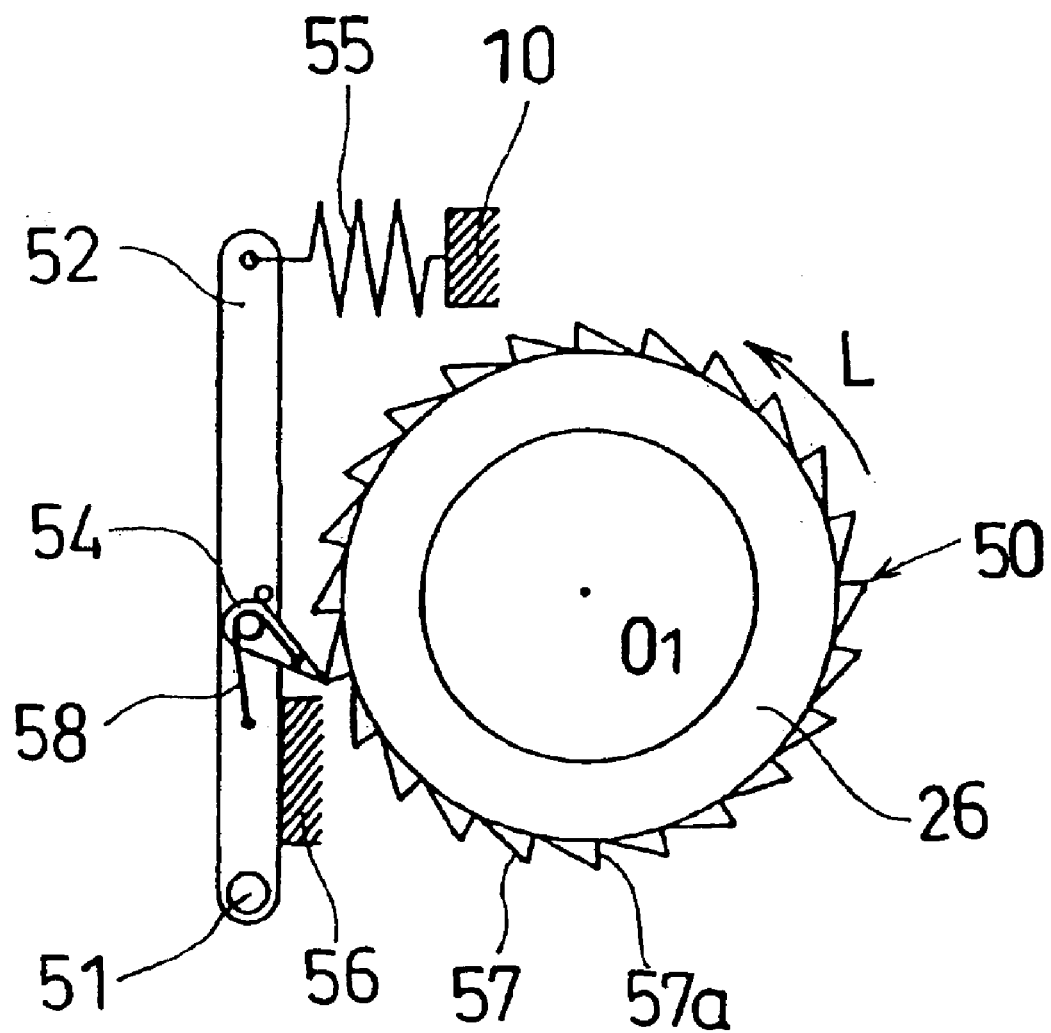
FIG. 5 is another schematic view showing the parking brake locking mechanism in operation according to the first embodiment.

At the same time, the claw wheel 50 of the parking brake locking mechanism 16 rotates in the counterclockwise direction L integrally, along with the rotor 26, so that as shown in FIG. 5, the engaging claw 54 is pressed down against the force of the torsion spring 58 by the tooth faces 57a of the tooth portions 57. As a result, the rotor 26 smoothly rotates in the counterclockwise direction (brake releasing direction) L to assure the releasing of the electric brake. That is, the parking brake locking mechanism 16 is automatically unlocked (detached) by the rotational torque produced when electricity is supplied to the motor 12. Thus, sophisticated control of rotation of the motor 12 is not required.
(In Operating Parking Brake)

When the driver activate the parking brake, the rotor 26 of the motor 12 rotates in the clockwise direction R. The piston 11 then moves to produce the braking force as is the above case where the electric brake is turned on. Further, according to the first embodiment, control is made on supply of electricity to the motor 12 to cut it off simultaneously with the production of the braking force. When electricity is cut off, a rotational torque appears in the counterclockwise direction L on the rotor 26 of the motor 12 by influence of rigidity of the caliper or the like. This rotational torque exerts downward force on the engaging claw 54 of the parking brake locking mechanism 16 is pushed down. However, since the rotational torque from the rotor 26 is significantly smaller than that from it when the electric motor is operated, the engaging claw 54 is held, due to the urging force of the torsion spring 58, in the projecting position shown in FIG. 3 in which it is in contact with the projection 59. As a result, engagement of the engaging claw 54 and the claw wheel 50 restricts the rotor 26 from rotating in the counterclockwise direction L, whereby the parking brake becomes effective.

(In Releasing Parking Brake)

When the driver releases the parking brake, electricity begins to flow through the motor 12. As is the case where the electric brake is turned off, the rotor 26 rotates in the counterclockwise direction (brake releasing direction) L, and the claw wheel 50 of the parking brake locking mechanism 16 also rotates in the same direction L integrally, along with the rotor 26. Since the rotational torque of the rotor 26 at this time is considerably larger than the urging force of the torsion spring 58 trying to hold the engaging claw 54 in the projecting position, as shown in FIG. 5, the engaging claw 54 is pressed down by the rotation of the steep tooth engaging face 57a of the tooth portion 57 of the claw wheel 50. That is, the rotor 26 becomes free in rotation in the direction in which the brake is released. As the rotor so rotates, the piston 11 is moved rearward, and the pressure on the disk rotor D is removed and the parking brake is thereby released.

Figure 6:
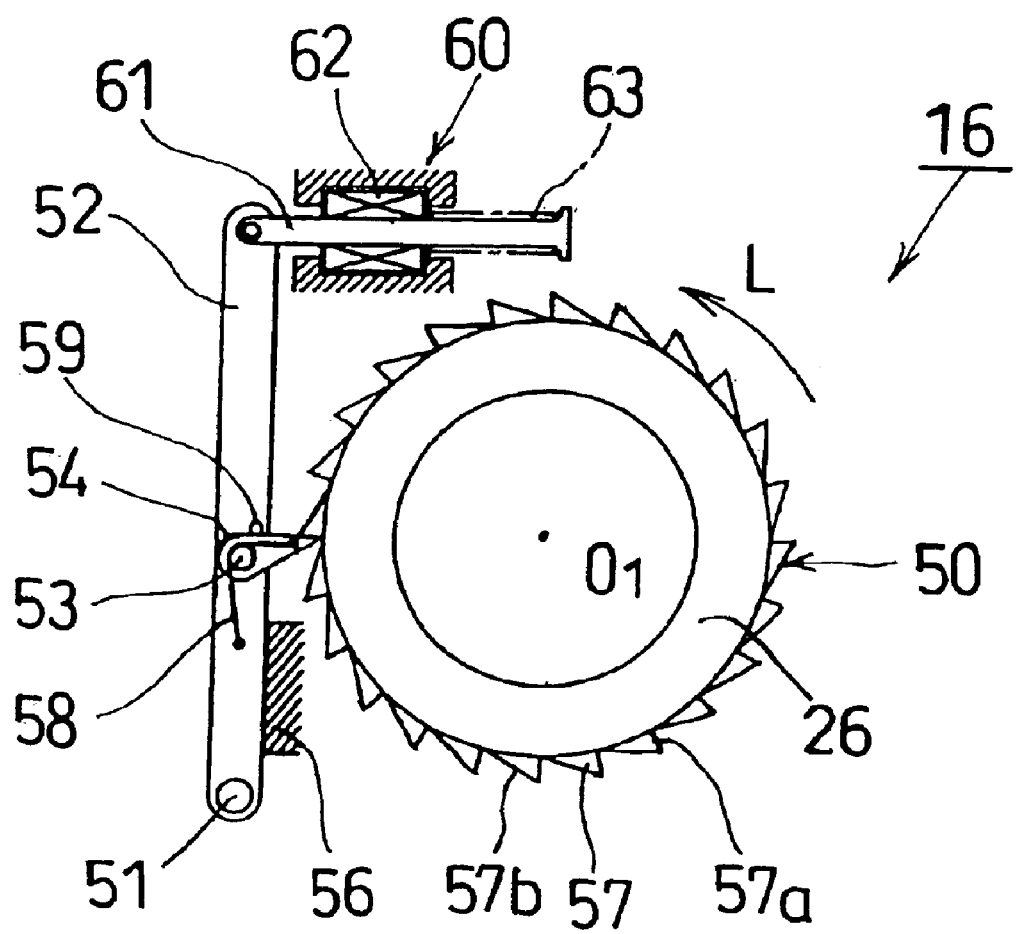
FIG. 6 is a schematic view showing the structure of a parking brake locking mechanism according to a second embodiment of the invention.
Figure 7:
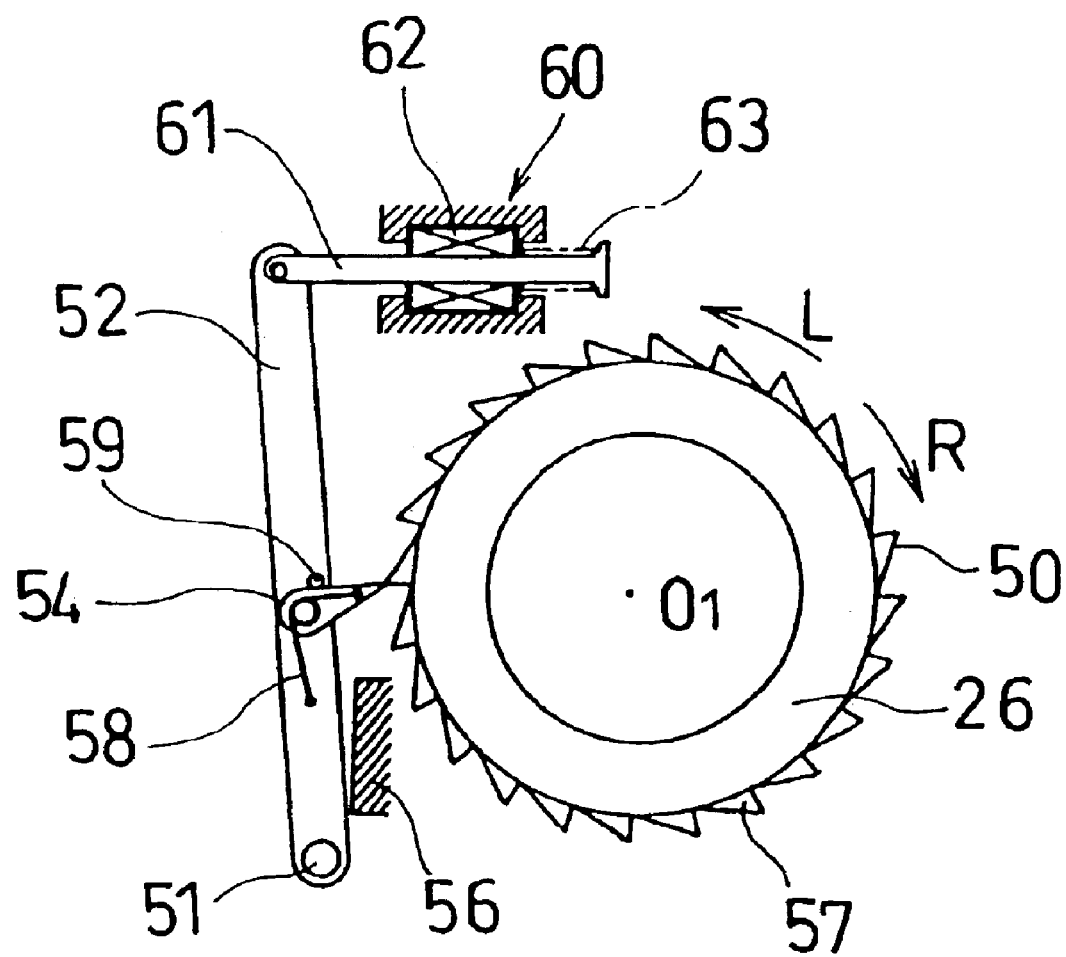
FIG. 7 is a schematic view showing the parking brake locking mechanism in operation according to the second embodiment.
Figure 8:
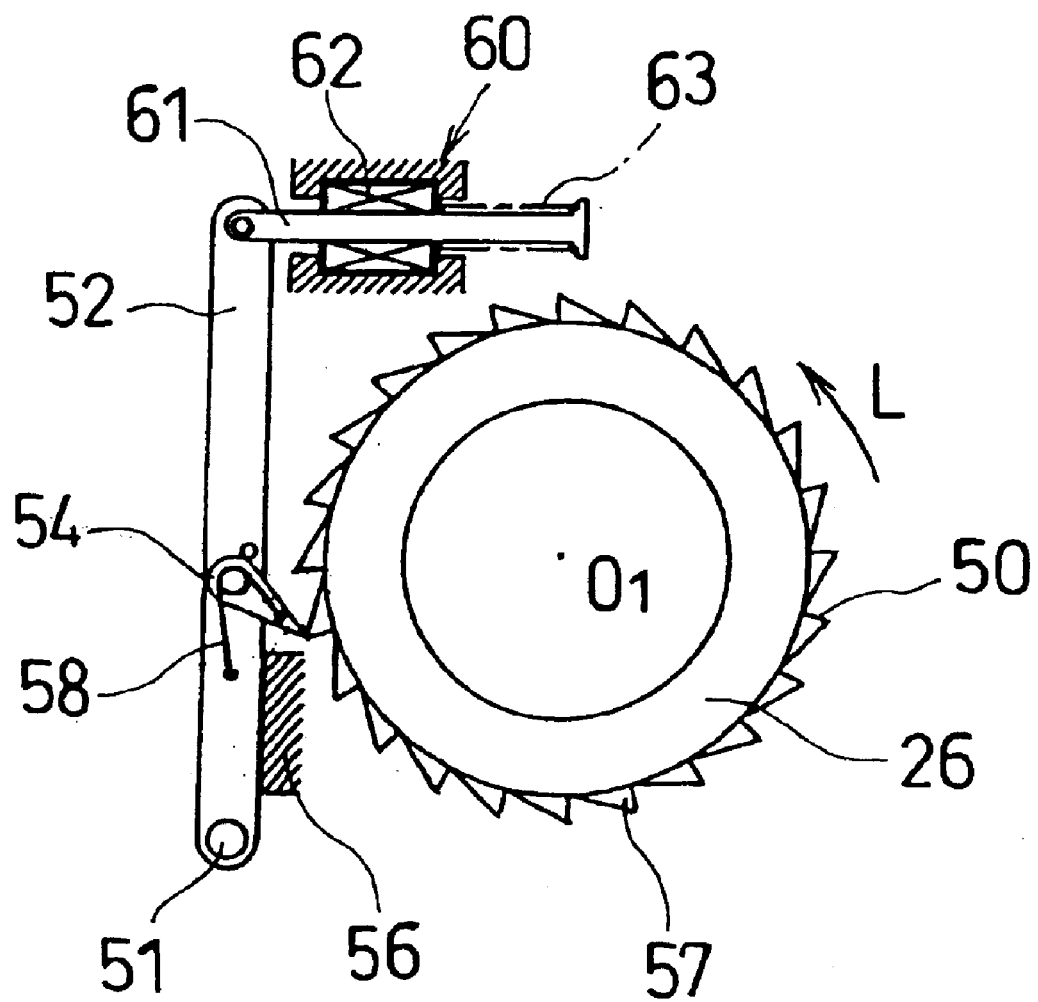
FIG. 8 is another schematic view showing the parking brake locking mechanism in operation according to the second embodiment.

FIGS. 6 through 8 show an electric braking apparatus according to a second embodiment of the invention. Since the other parts of the electric braking apparatus are the same as those shown in FIGS. 1 and 2, an illustration thereof is omitted here. Further, the basic structure of the parking brake locking mechanism 16 is the same as that of the first embodiment. Therefore, the same parts and portions are given the same numbers and description thereof is omitted here. The second embodiment is characterized in that a solenoid mechanism 60 is used in place of the tensile spring 55 in the above-described parking brake locking mechanism 16. The solenoid mechanism 60 includes: a solenoid (actuator) 62 which is fixed to the caliper main body 10; a plunger 61 the front end portion 61 of which is pivotally attached to the arm lever 52; and a compressing spring (urging means) 63 which normally pulls the plunger 61 of the solenoid 62 rearward. The arm lever 52 is normally held upright in contact with the stopper portion 56 by the function of the compressing spring 63 (FIG. 6). With supply of electricity, the solenoid 62 operates to move the plunger 61 forward, which then hold the arm lever 52 inclined in the direction away from the claw wheel 50 (FIG. 7).

An explanation will be given of operation of the electric braking apparatus according to the second embodiment.

(Actuating the Electric Brake)

In the normal operation of the electric braking apparatus, the rotor 26 of the motor 12 rotates clockwise as seen from the right in FIGS. 1 and 2. When the driver inputs the brake operating signal, as happens in the first embodiment, the piston 11 moves to generate braking force proportional to the torque of the motor 12. Further, when the electric brake is operated, simultaneously with supply of electricity to the motor 12, electricity is also supplied to the solenoid 62 of the brake locking mechanism 16. As a result, the plunger 61 of the solenoid 62 extends as shown in FIG. 7. The arm lever 52 is thus held inclined away from the claw wheel 50. When the arm lever 52 is inclined, the engaging claw 54 is held in a position where it is slightly away from the tooth portion 57 of the claw wheel 50, so that the rotor 26 becomes free in rotation in the clockwise direction (braking direction) R to assure the proper functioning of the electric brake. Since the rotor 26 rotates while the engaging claw 54 and the claw wheel 50 are not in contact with each other, noise from contact of these members and wear on these members are prevented. Furthermore, due to no contact resistance between these members, the motor 12 can work efficiently.

(Deactivating the Electric Brake)

When the driver releases the electric brake, the rotor 26 of the motor 12 rotates counterclockwise as viewed from the right in FIGS. 1 and 2. The piston 11 then moves rearward to thereby release braking. However, electricity to the solenoid 62 of the brake locking mechanism 16 is kept on, so that the engaging claw 54 of the brake locking mechanism 16 is held slightly away from the tooth portion 57 of the claw wheel 50 as shown in FIG. 7. The claw wheel 50 of the parking brake locking mechanism 16 thus becomes free in rotation in the counterclockwise direction (brake releasing direction) L, together with the rotor 26, without contact with the engaging claw 54, whereby release of the electric brake is assured.

(Activating the Parking Brake)

When the driver operates the parking brake, the rotor 26 of the motor 12 rotates in the clockwise direction R. Similarly to the normal operation of the electric brake, the piston 11 moves to generate the braking force. Further, according to the second embodiment, control is made on the electricity supplied to the solenoid 62 of the parking brake locking mechanism 16 and the motor 12 so as to cut it off simultaneously with generation of the braking force. As supply of electricity to the solenoid 62 is cut off, as shown in FIG. 6, the plunger 61 moves rearward due to the urging force of the compressing spring 63. The arm lever 52 then returns to its initial upright position, whereby the engaging claw 54 is positioned so as to engage with the claw wheel 50. Further, as electricity to the motor 12 is cut off, a rotational torque appears on the rotor 62 of the motor 12 in the counterclockwise direction L by influence of rigidity of the caliper or the like. This rotational torque exerts downward force on the engaging claw 54 of the parking brake locking mechanism 16. However, since the rotational torque of the rotor 26 is significantly smaller than that when the electric motor is operating, as shown in FIG. 6, the engaging claw 54 is held, due to the urging force of the torsion spring 58, in the projecting position in which it is in contact with the projection 59. Engagement of the engaging claw 54 and the claw wheel 50 restricts the rotor 26 from rotating in the counterclockwise direction (brake releasing direction) L. As a result, the parking brake performs its function.

(Releasing the Parking Brake)

When the driver releases the parking brake, electricity begins to flow though the solenoid 62 of the parking brake locking mechanism 16 to extend the plunger 61 of the solenoid 62. The engaging claw 54 of the brake locking mechanism 16 is held slightly away from the tooth portion 57 of the claw wheel 50 as shown in FIG. 7. Simultaneously with supply of electricity to the solenoid 62, electricity is also supplied to the motor 12, and, as happened in the release operation of the electric brake, the rotor 26 rotates in the counterclockwise direction (brake releasing direction) L. The claw wheel 50 of the parking brake locking mechanism 16 then rotates smoothly in the counterclockwise direction L, along with the rotor 26, without contact with the engaging claw 54 (FIG. 7), so that the parking brake is released.

Further, according to the second embodiment, if the solenoid 62 becomes inoperative, as shown in FIG. 8, the plunger 62 remains retracted rearward. However, the compressing spring 63 works to pull the plunger 62 rearward as the tensile spring 55 does (FIGS. 3 through 5) in the first embodiment. Therefore, the parking brake can be operated.

Figure 9:
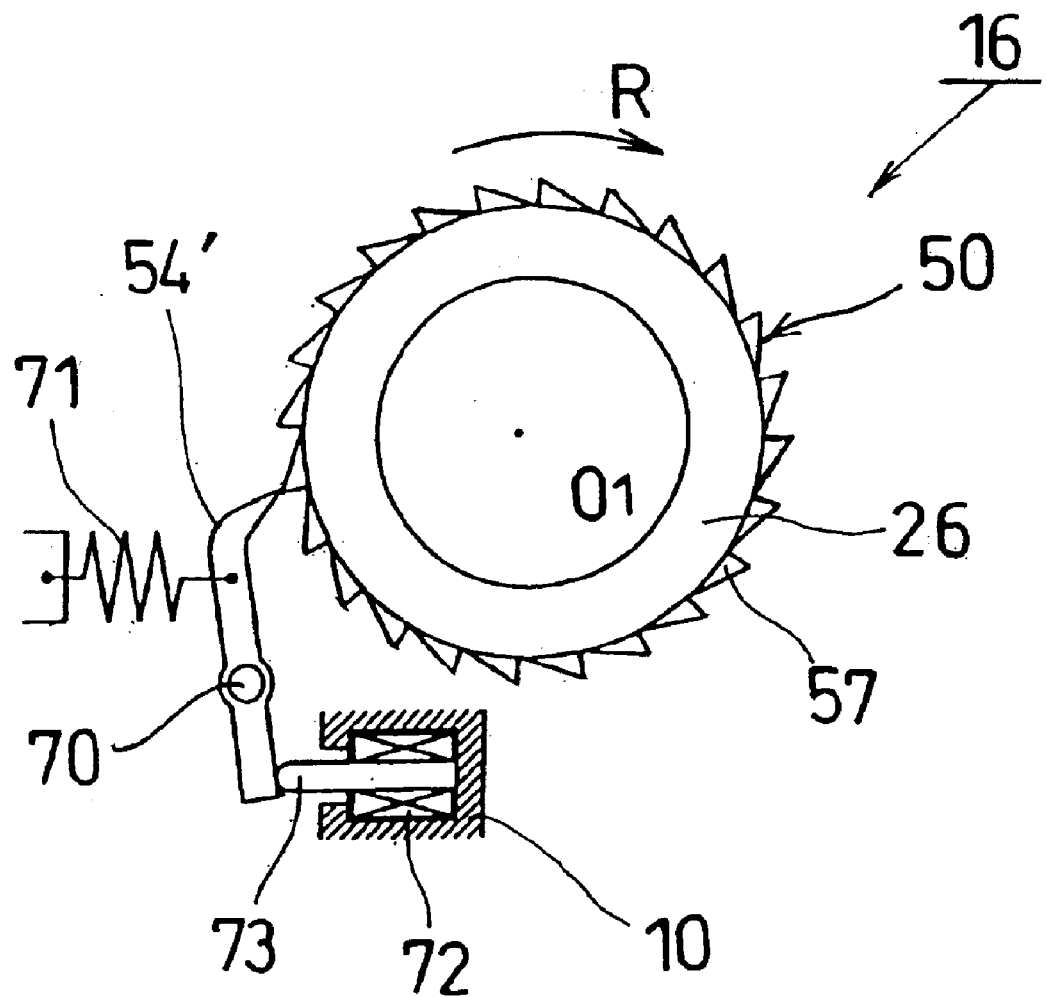
FIG. 9 is a schematic view showing the structure of a parking brake locking mechanism according to a third embodiment of the invention.
Figure 10:
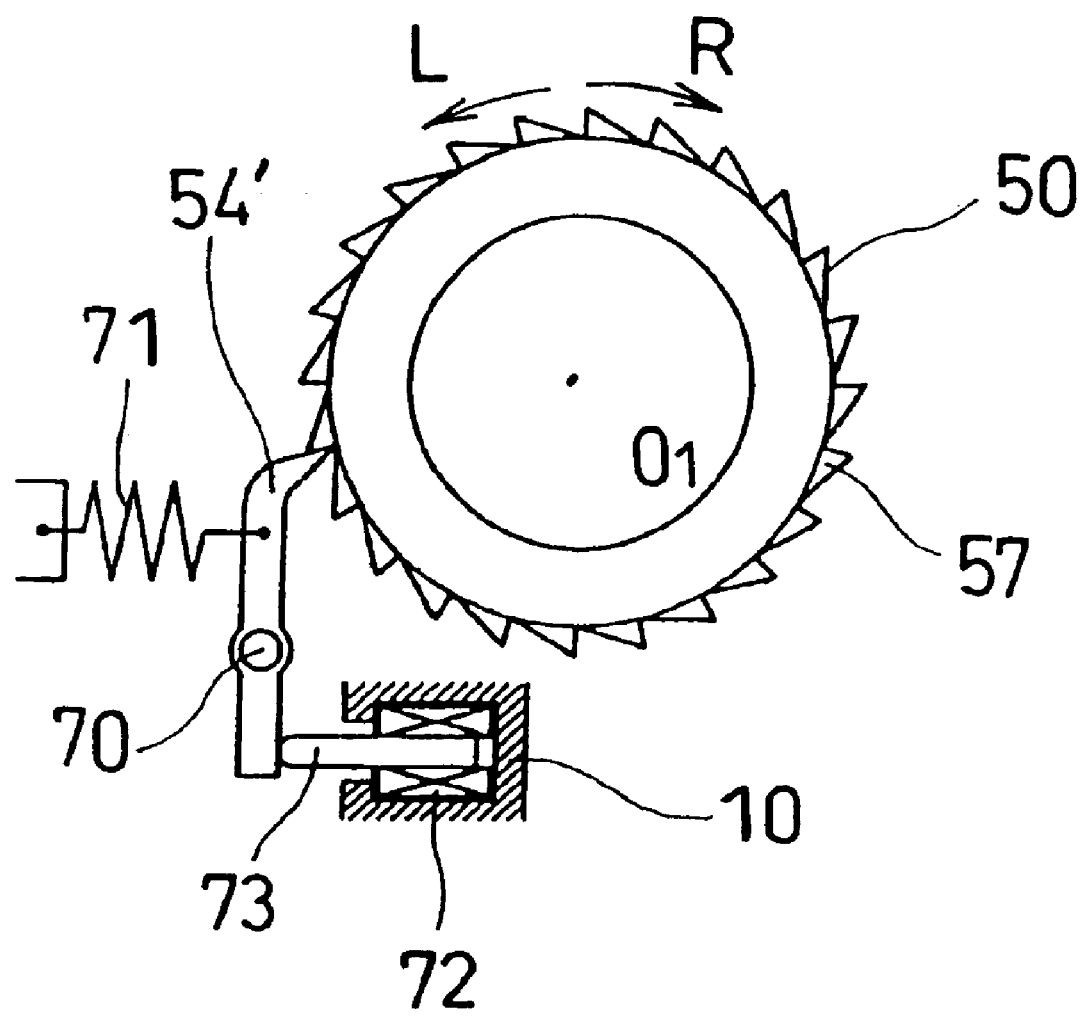
FIG. 10 is a schematic view showing the parking brake locking mechanism in operation according to the third embodiment.

FIGS. 9 and 10 show an electric braking apparatus according to a third embodiment of the invention. The other parts of the electric braking apparatus are the same as those shown in FIGS. 1 and 2 and therefore, an illustration thereof is omitted. This third embodiment is characterized in that there is no member corresponding to the arm lever 52 of the parking brake locking mechanism 16 in the first and the second embodiments. Instead, a relatively large and long engaging claw 54' engages with the claw wheel 50. The engaging claw 54' is pivotally attached in its middle to the caliper main body 10 by using a pin 70. Further, the caliper main body 10 has a tensile spring (urging means) 71 for urging the engaging claw 54' away from the claw wheel 50 and a solenoid 72 for rotating the engaging claw 54' to a position where it engages with the claw wheel 50. Further, with supply of electricity, the solenoid 72 operates to extend a plunger 73 thereof.

An explanation will be given of operation of the electric braking apparatus according to the third embodiment.
(Activating the Electric Brake)

When the apparatus performs the normal braking operation, with a brake operating signal from the driver, the rotor 26 of the motor 12 rotates clockwise as viewed from the right in FIGS. 1 and 2. The piston 11 then moves, as it does in the first and the second embodiments, to generate braking force proportional to the torque of the motor 12. Further, when the electric brake is in operation, supply of electricity to the solenoid 62 of the brake locking mechanism 16 is cut off. Thus, as shown in FIG. 9, the engaging claw 54' is placed slightly away from the tooth portion 57 of the claw wheel 50 by the urging force of the tensile spring 71. As a result, the rotor 26 becomes free in rotation in the clockwise direction R, whereby the function as the electric brake is assured. Also, since the rotor 26 rotates while the engaging claw 54' is away from the claw wheel 50, as happens in the second embodiment, both noise and wear are prevented. Furthermore, the motor 12 can work efficiently.
(Releasing the Electric Brake)

When the driver release the electric brake, the rotor 26 of the motor 12 rotates counterclockwise as viewed from the right in FIGS. 1 and 2. The piston 11 moves rearward to thereby release the braking. Since at that time, electricity to the solenoid 72 of the parking brake locking mechanism 16 is cut off, the engaging claw 54' of the brake locking mechanism 16 remains slightly away from the tooth portion 57 of the claw wheel 50 as shown in FIG. 9. The claw wheel 50 of the parking brake locking mechanism 16 thus smoothly rotates in the counterclockwise direction L, along with the rotor 26, without contacting the engaging claw 54', whereby release of the electric brake is reliably carried out.
(Activating the Parking Brake)

When the driver operates the parking brake, the rotor 26 of the motor 12 rotates in the clockwise direction R. The piston 11 thereby moves as it does in the normal operation of the electric brake to generate the braking force. Further, according to the third embodiment, control is made in such manner that electricity begins flowing through the solenoid 72 of the brake locking mechanism 16 simultaneously with generation of the braking force while electricity to the motor 12 is cut off. With supply of electricity to the solenoid 62, the plunger 73 extends. The engaging claw 54' is thereby positioned so that it engages with the claw wheel 50 against the urging force of the tensile spring 71, as shown in FIG. 10. Further, after cutting off electricity to the motor 12, a rotational force appears on the rotor 26 of the motor 12 in the counterclockwise direction L due to the influence of the caliper rigidity or the like. This rotational force pushes downward the engaging claw 54' of the parking brake locking mechanism 16, whereby rotation of the rotor 26 in the counterclockwise direction L is restricted. As a result, the parking brake properly functions. With a tensile spring 71 having urging force smaller than the rotational force of the rotor 26, the force of the claw wheel 50 pushing the engaging claw 54' overcomes the urging force of the tensile spring 71. Thus, electricity to the solenoid 72 may be cut off at an appropriate timing.
(Releasing the Parking Brake)

When the driver releases the parking brake, supply of electricity begins to the motor 12. The rotor 26 then rotates slightly in the clockwise direction (braking direction) R. By the urging force of the tensile spring 71, the engaging claw 54' rotates counterclockwise away from the tooth portion 57 of the claw wheel 50. When the rotor 26 of the motor 12 is thereafter rotated in the counterclockwise direction (brake releasing direction) L thereafter at an appropriate timing, the claw wheel 50 of the parking brake locking mechanism 16 smoothly rotates in the counterclockwise direction L, along with the rotor 26, without contacting the engaging claws 54 (FIG. 9), and thereby the parking brake is released.

According to the third embodiment, when the parking brake is operated, electricity is supplied only temporarily to the solenoid 72. Thus, heat generation from the solenoid 72 is suppressed.

FIGS. 11 through 14 show an electric braking apparatus according to a fourth embodiment of the invention. The other parts of the electric braking apparatus are the same as those shown in FIGS. 1 and 2 and therefore, an illustration of these parts is omitted. According to the fourth embodiment, the coil spring 47 is set to have a torque larger than residual torque that comes from the differential speed reducing mechanism 14 when the motor is not rotated. Thus, the coil spring 47 functions as a piston returning mechanism for returning the piston 11 to a reference position when the motor is not in operation.

Figure 11:
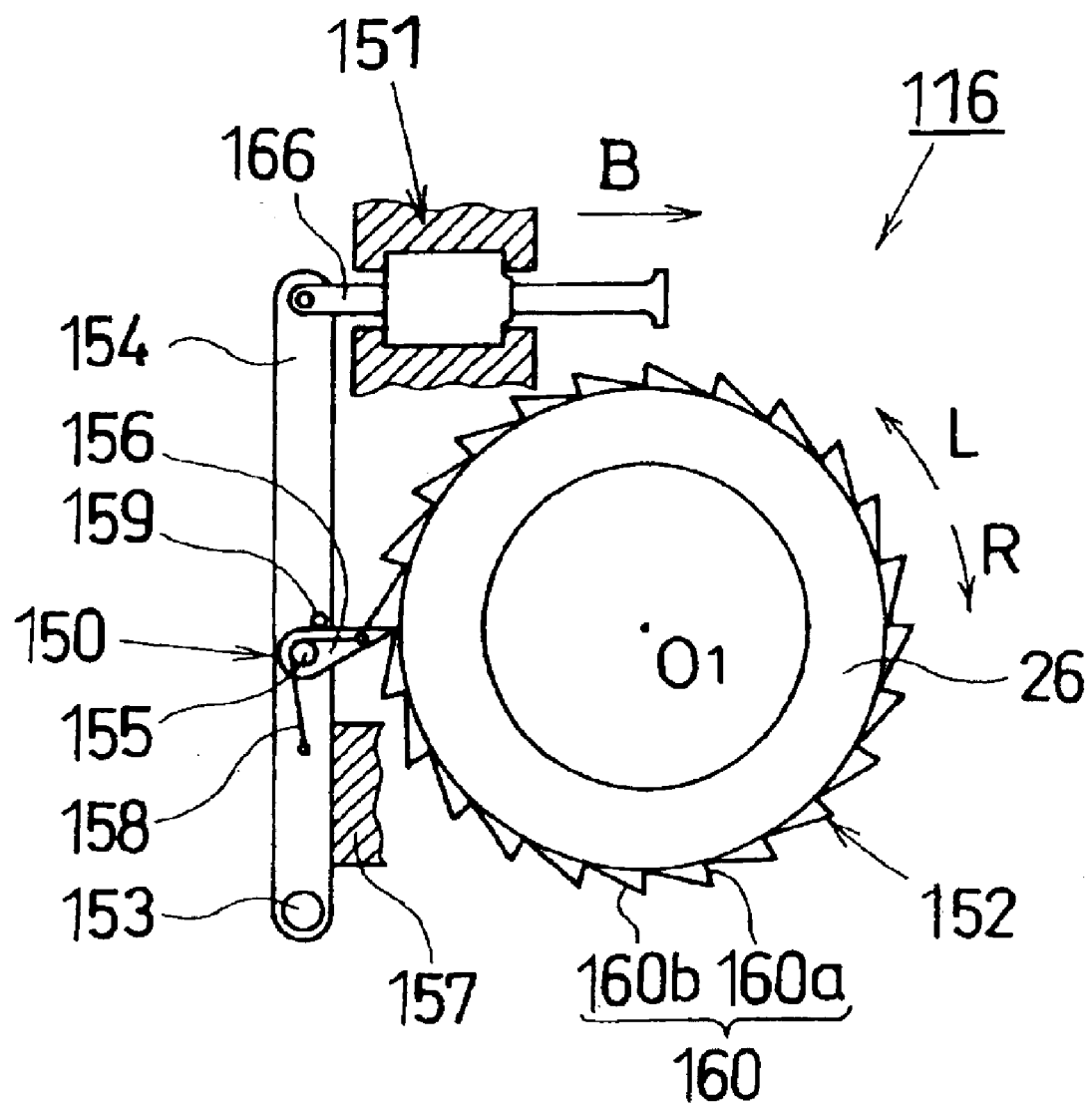
FIG. 11 is a schematic view showing the structure of a parking brake locking mechanism according to a fourth embodiment of the invention.
Figure 12:
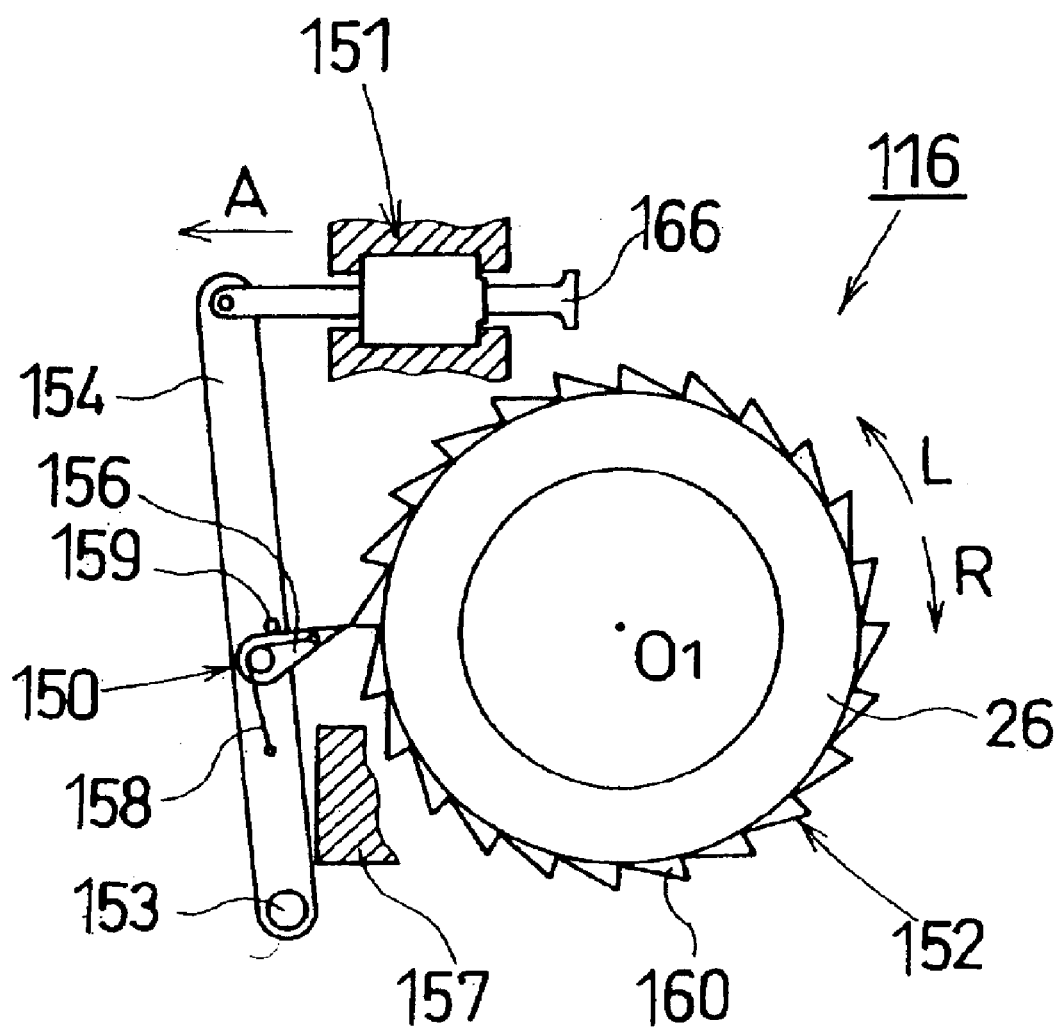
FIG. 12 is a schematic view showing the parking brake locking mechanism in operation according to the fourth embodiment.
Figure 13:
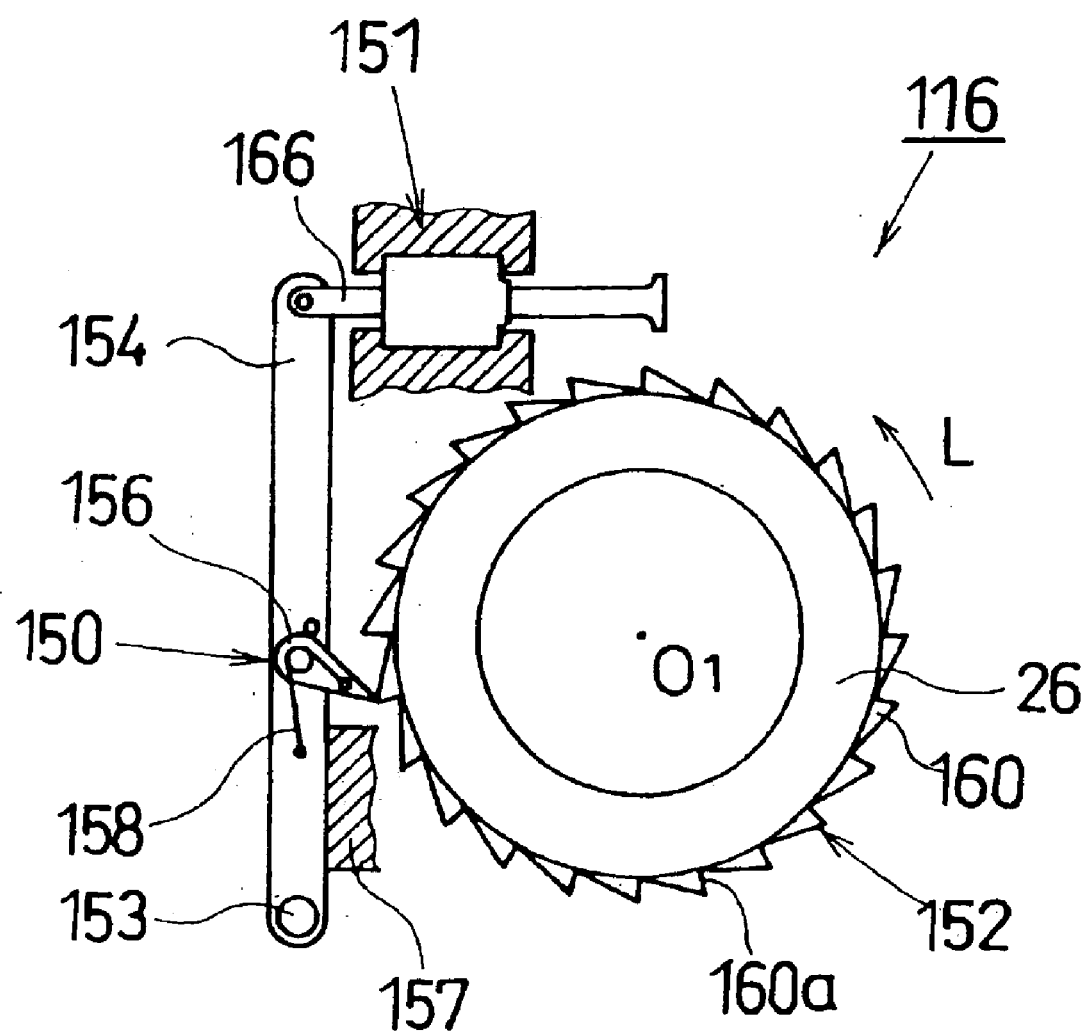
FIG. 13 is another schematic view showing the parking brake locking mechanism in operation according to the fourth embodiment.

As is well shown in FIGS. 11 through 13, the parking brake locking mechanism 116 according to the fourth embodiment includes a locking mechanism 150 capable of locking the rotor 26 of the motor 12 against rotating in the brake releasing direction L and releasing the lock, and a solenoid (actuator) 151 for causing this locking mechanism 150 to perform the locking and unlocking functions.

The locking mechanism 150 is provided with: a claw wheel 152 integrally formed around the outer peripheral of the rotor 26; a arm lever 154, arranged near the claw wheel 152, the base end portion of which is pivotally attached to the caliper main body 10 by using a pin 153; an engaging claw 156, the base end portion of which is pivotally attached to the mid portion of the arm lever 154 by using a pin 155; a stopper portion 157 provided at the caliper main body 10 against which the arm lever 154 abuts along its side and is held thereby in the direction tangential to the rotor 26; a torsion spring (urging means) 158 for normally urging the engaging claw 156 counterclockwise as viewed in FIG. 11; and a projection 159 for, acting with the torsion spring 158, stopping and holding the engaging claw 156 in an position where the engaging claw 156 engages with the claw wheel 152. Here, each tooth portion 160 of the claw wheel 152 is provided with a steep tooth engaging face 160a facing front when the rotor 26 rotates in the direction L for releasing the brake (the counterclockwise direction in FIGS. 1 and 2) and an inclined escape face 160b facing front when the rotor 26 rotates in the direction R for applying the brake (the clockwise direction in FIGS. 1 and 2).

Figure 14:
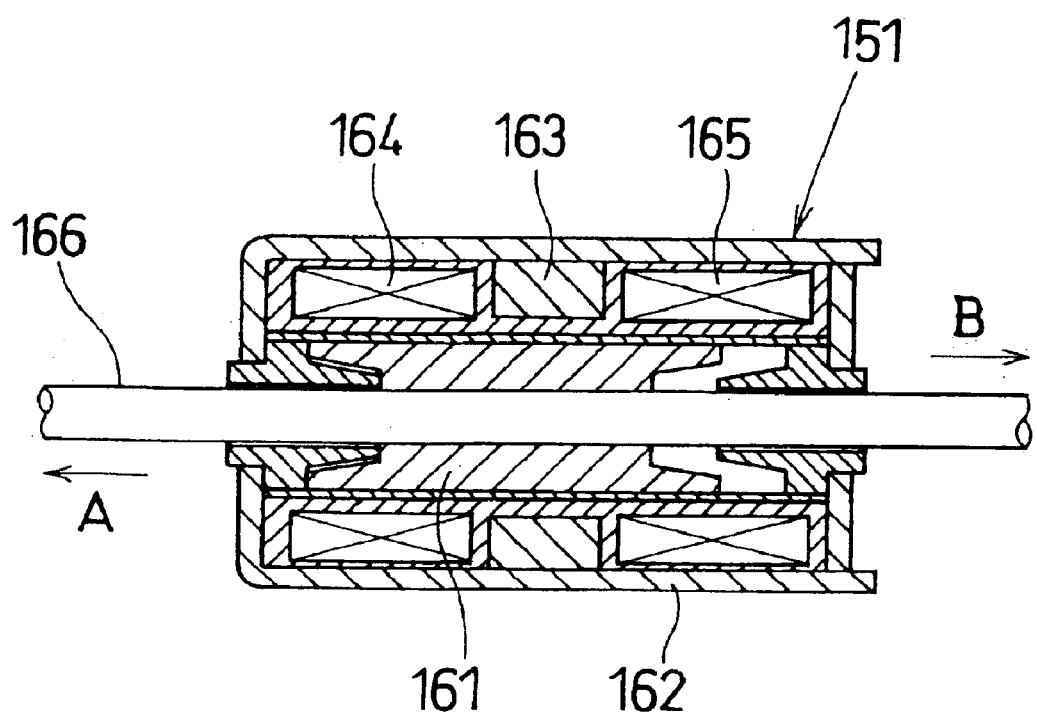
FIG. 14 is a sectional view showing the structure of a self-holding type solenoid used in the fourth embodiment.

The solenoid 151, serving as an actuator, is of a two direction self-holding type. As shown in FIG. 14, the solenoid 151 of a two direction self-holding type is comprised of a housing 162 containing a plunger 161 for sliding therein, and two coils 164 and 165 arranged in series and sandwiching a permanent magnet 163 therebetween. A rod 166 is supported by the plunger 161. By supplying electricity alternately to the coil 164 or 165, the plunger 161 moves in either direction A or B to either the forward extension point or the rear extension point where it is held by the pulling force of the permanent magnet 163.

As shown by FIGS. 11 through 13, the parking brake locking mechanism 116 includes the solenoid 151 of a self-holding type provided on the caliper main body 10, where one end portion of the rod 166, being supported by the plunger 161, is pivotally attached to the end of the arm lever 154 of the locking mechanism 150.

In the parking brake locking mechanism 116 of such a structure, when electricity is supplied to the coil 164 of the solenoid 151, the rod 166, being supported by the plunger 161, moves left A (the forward moving direction) in FIG. 12. The arm lever 154 then rotates away from the rotor 26, whereby the front end of the engaging claw 156 leaves a tooth portion 160 of the claw wheel 152. That is, the locking mechanism 150 performs the unlock operation. The rotor 26 thereby becomes free in rotation in the brake releasing direction L and the braking direction R. Since the plunger 161 is held in the forward extension position even after the supply of electricity is cut off, a supply of electricity to the coil 164 may be temporary. Further, when electricity is supplied to the other coil 165 from this state, the rod 166 moves, along with the plunger 161, to the right (the rearward direction B) in FIG. 11. The arm lever 154 rotates towards the rotor 26. The front end of the engaging claw 156 engages with a tooth portion 160 of the claw wheel 152. That is, the locking mechanism 150 performs its locking operation. As a result, rotation of the rotor 26 in the brake releasing direction L is restricted. Also, since the plunger 161 is held ion the rear extension position even after supply of electricity is stopped, a supply of electricity to the coil 165 may be temporary. Suppose that while the locking mechanism 150 is in the locking position, electricity is supplied to the motor 12 to forcibly rotate the rotor 26 in the brake releasing direction L. Since the motor torque is larger than the urging force of the torsion spring 158, the rotor 26 will rotate in the brake releasing direction L while the steep tooth engaging faces 160a of the tooth portions 160 of the claw wheel 152 are pushing down the engaging claw 156.

Operation of the electric braking apparatus according to the fourth embodiment will here be explained, referring again to FIG. 15 through FIG. 18.
(Normal Braking Operation)

Figure 15:
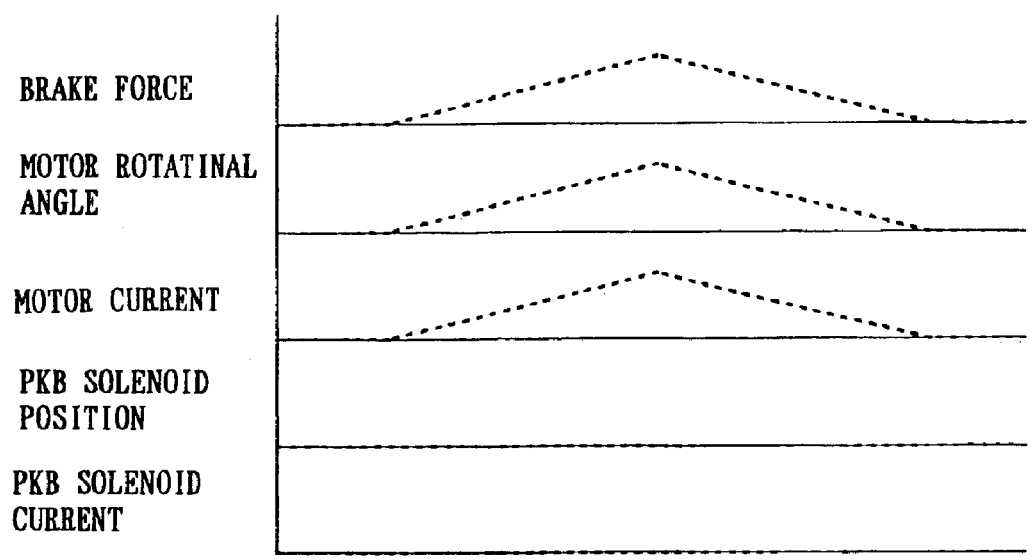
FIG. 15, FIG. 16, FIG. 17 and FIG. 18 are time charts showing operational timings of an electric brake and a parking brake in an electric braking apparatus according to the fourth embodiment.

When the drive initiates the normal braking of the electric brake, the rotor 26 of the motor 12 rotates clockwise as viewed from the right in FIGS. 1 and 2. At this time, as shown in FIG. 12, the solenoid 151 of the parking brake locking mechanism 116 moves the rod 166, along with the plunger 161, to the forward extension position, where the locking mechanism 150 is held in the unlock position due to the self-holding capability of the solenoid 151. Therefore, when the rotor 26 rotates clockwise as described above, the eccentric plate 41 attached to the eccentric shaft 39 via the bearing 40 revolves, not rotate, by the function of the Oldham mechanism 42. Revolution of the eccentric plate 41 causes the cycloid ball speed reducing mechanism 43 to operate. The first disk 31 of the ball ramp mechanism 13 thereby rotates in the opposite direction than the rotor 26 (the counterclockwise direction) at a speed with a ratio N to the rotor speed, as described above. Since the second disk 32 of the ball ramp mechanism 13 is restricted in rotation by the resistance force of the wave washer 34, the second disk 32 moves forward towards the disk rotor D as the first disk 31 rotates. Thus, the piston 11 moves, and the brake pad 3 facing the interior of the vehicle is pressed against the disk rotor D. Then, in reaction thereto, the caliper 2 moves relative to the carrier 1, whereby the claw portion 5a of the claw member 5 presses the brake pad 4 facing the outside of the vehicle against the outer side face of the disk rotor D. As shown by FIG. 15, braking force of a magnitude proportional to the rotational angle and the torque (current) of the motor 12 is generated. Further, when the brake pads 3 and 4 are worn, the gap caused by the pad wear is eliminated by the operation of the pad wear compensating mechanism 15 as described above. Further, while braking is effective, electricity to the self-holding type solenoid 151 is cut off, but the locking mechanism 150 is held in its unlocking position.
(Releasing the Normal Braking)

When the driver releases the electric brake, the rotor 26 of the motor 12 rotates counterclockwise as viewed from the right in FIGS. 1 and 2. The urging force of the disk springs 38 moves the second disk 32 rearward, along with the piston 11. The force pressing the disk rotor D is thereby released, and the electric brake is thus released. At this time, electricity to the self-holding type solenoid 151 is cut off, and the locking mechanism 150 of the parking brake locking mechanism 116 is held in the unlocking position. Accordingly, the rotor 26 can smoothly rotates in the brake releasing direction L (FIG. 12).
(Occurrence of Failure During the Normal Braking Operation)

Figure 16:
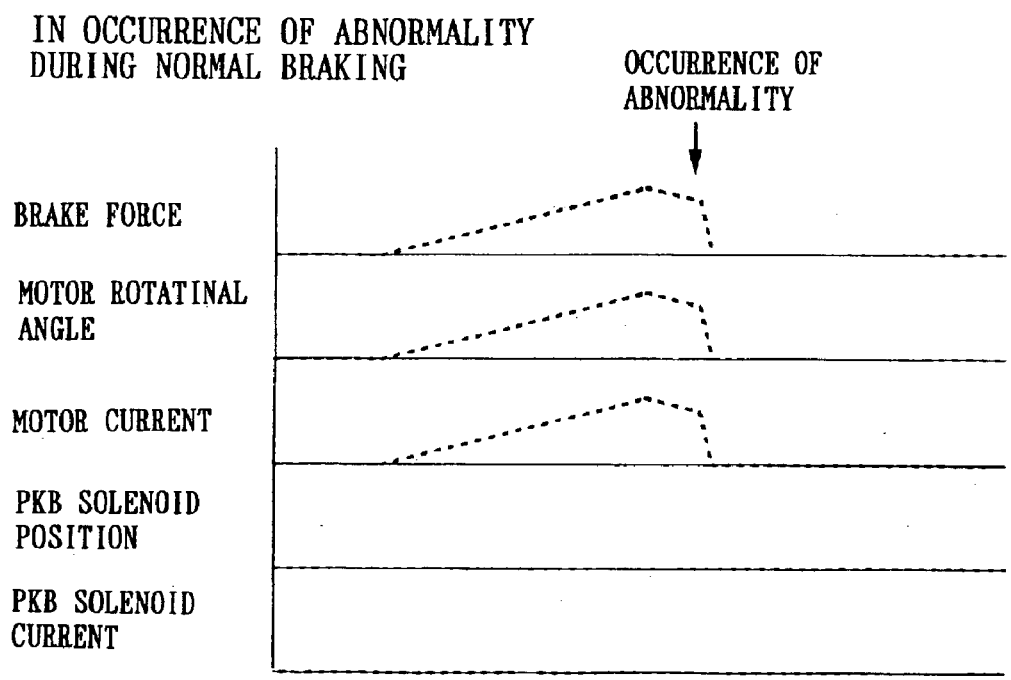

If a failure occurs in the electric circuit of the motor 12 for some reason during the above-described normal braking operation, the torque (current) of the motor 12 drops as shown in FIG. 16. The piston returning mechanism (coil spring 47) or reactive force from the brake pads causes the piston 11 to move rearward. The second disk 32 then moves rearward. The rotor 26 of the motor 12 thereby rotates counterclockwise as viewed from the right in FIGS to the original angle position, whereby the electric brake is released. Since the locking mechanism 150 of the parking brake locking mechanism 116 is held in the unlocking position as it is in the normal braking operation, the electric brake is smoothly released.
(Operation of the Parking Brake (PKB))

Figure 17:
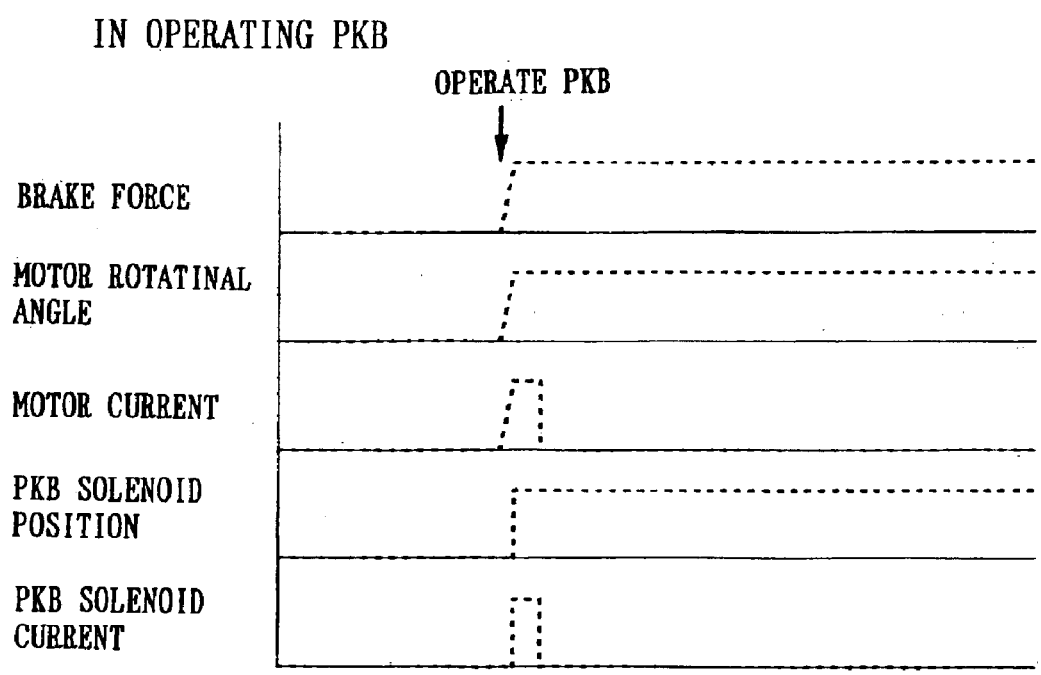

When the driver operates the parking brake, the rotor 26 of the motor 12 rotates clockwise as viewed from the right in FIGS. 1 and 2, as it does in the above-described normal braking operation. The piston 11 thereby moves, so that as shown in FIG. 17, braking force proportional to the rotational angle and the torque (current) of the motor 12 is generated. Further, simultaneously with the generation of the braking force, electricity is supplied temporarily to the coil 165 (FIG. 14) in the self-holding type solenoid 151 of the parking brake locking mechanism 116. Thereby, the rod 166 moves in the rearward direction B, along with the plunger 161 in the solenoid 151, and the locking mechanism 150 is brought into the locking position. Thus, as shown in FIG. 11, the rotor 26 is restricted in rotation in the brake releasing direction L. Further, at about the same time electric current is supplied to the self-holding type solenoid 151, supply of electricity to the motor 12 is cut ff. As a result, the locking mechanism 150 of the parking brake locking mechanism 116 is held in the locking position by the self-holding capability of the solenoid 151. Thus, as shown in FIG. 17, the parking brake is kept effective.

(Releasing the Parking Brake (PKB))

Figure 18:
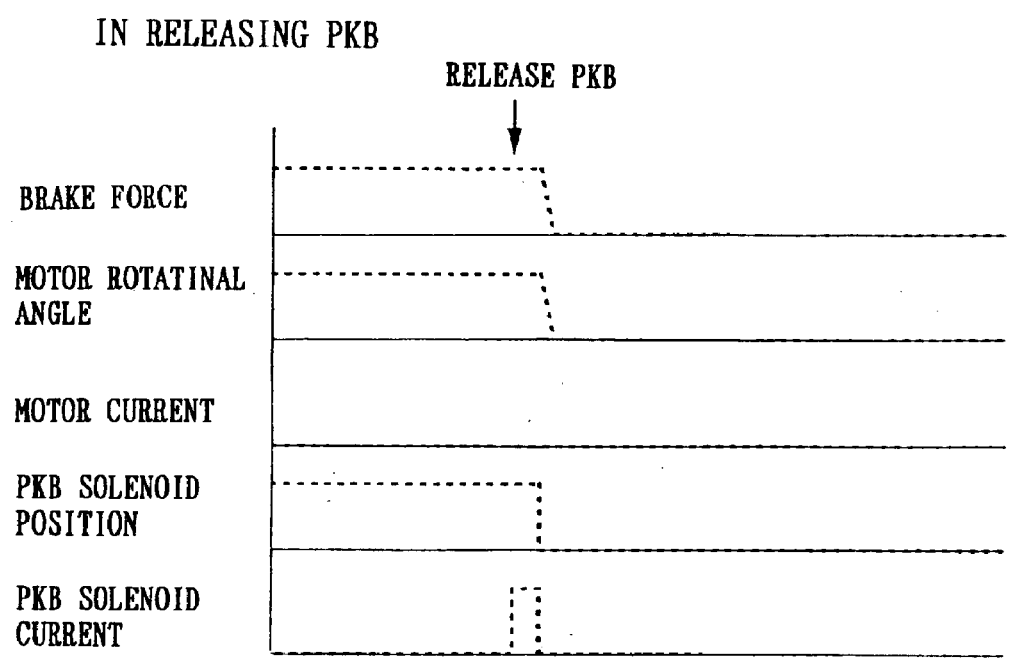

When the driver releases the parking brake, electricity is supplied temporarily to the coil 164 (FIG. 14) of the self-holding type solenoid 151 of the parking brake locking mechanism 116. Thereby, the rod 166, along with the plunger 161 in the solenoid 151, moves in the forward direction A. The locking mechanism 150 is thus brought into the unlocking position in which as shown by FIG. 12, the rotor 26 becomes free in rotation in the brake releasing direction L. At this time, since the supply of electricity to the motor 12 is stopped, the piston 11 moves rearward by reactive force from the brake pads. The second disk 32 in turn moves rearward, and the rotor 26 of the motor 12 rotates counterclockwise as viewed from the right in FIGS. 1 and 2. As a result, as shown in FIG. 18, the motor 12 returns to its original angle position, whereby the parking brake is released.

(Occurrence of Failure During the Parking Brake Operation)

Suppose that the solenoid 151 fails or becomes inoperable for some reason while the parking brake is in operation. When the driver releases the parking brake, electricity is supplied to the motor 12 as happens when the electric brake is released. The rotor 26 then rotates counterclockwise as viewed from the right in FIGS. 1 and 2. The claw wheel 152 of the parking brake locking mechanism 116 thereby rotates in the brake releasing direction L, along with the rotor 26. Since the rotational torque of the rotor 26 at this time is considerably larger than the urging force of the torsion spring 158 holding the engaging claw 156 upright, the engaging claw 156, as shown in FIG. 13, kept pushed down by the steep tooth engaging faces 160a of the tooth portions 160 of the claw wheel 152. That is, the rotor 26 can be rotated in the brake releasing direction L. Along the rotation of the rotor, the piston 11 moves rearward, and the force pressing the disk rotor D is released, whereby the parking brake is released.

As has been described in detail, according to the electric braking apparatus of the invention, the parking brake is operated by utilizing rotation of the motor. Therefore, the parking brake function can sufficiently be achieved without sacrificing the basic braking function of the apparatus as an electric brake. Thus, the reliability of the apparatus is significantly improved.

Further, the parking brake locking mechanism is arranged around the rotor. Therefore, the axial length of the caliper can be made short, whereby the mountability of the apparatus to the vehicle is improved. Particularly, when the parking brake locking mechanism is arranged inside the caliper, the mountability to the vehicle is further improved.

Further, if the parking brake locking mechanism functions in such a manner that it releases the lock by operation of the rotational torque generated when electricity is supplied to the motor, since the parking brake locking mechanism can be unlocked by merely rotating the rotor in the brake releasing direction, control of the motor is simplified.

Further, if the parking brake locking mechanism functions in such a manner that an actuator having self-holding capability locks and unlocks the locking mechanism, the parking brake function can be sufficiently achieved without sacrificing the basic electric brake function. Further, even if the motor fails, the parking brake can be released with certainty. Thus, the reliability of the apparatus is significantly improved.

Further, when the self-holding type solenoid is used as the actuator, the structure of the actuator becomes simple and compact. Therefore, the caliper can be made small. Further, since electricity does not have to be constantly supplied, the apparatus contributes to power saving.

Further, when there is provided a piston returning mechanism for returning the piston to the reference position when there is no current supplied to the motor, even in case of failure in the motor and the actuator, by the function of the piston returning mechanism, the parking brake can reliably be released.

What is claimed is:

1. An electric braking apparatus, comprising:
an electric motor that is controlled in such a manner that it is activated to effectuate a parking brake and deactivated when the parking brake becomes in effect, whereas it is reversely activated to release the parking brake;
a mechanism that converts rotation of the motor into linear braking action of friction members to effectuate and release the parking brake and transfers brake reaction force back from the friction members while the parking brake is in effect;
a first engagement element that comprises teeth arranged on the first engagement element, the first engagement element being operably connected to the motor to move in a brake applying direction and a brake releasing direction, wherein the first engagement element is urged, while the parking brake is in effect, in the brake releasing direction by the brake reaction force transferred back from the friction members; and
a second engagement element that comprises a claw being urged by an engaging force to engage with the teeth of the first engagement element, wherein the engaging force is large enough to keep the claw engaged with one of the teeth and hold the first engagement element in place against the brake reaction force urging the first engagement element in the brake releasing direction, thereby holding the parking brake in effect while the motor is deactivated, whereas the engaging force is small enough to allow the claw to escape from the teeth when the first engagement element is driven by the motor in tile brake releasing direction to release the parking brake.

2. An electric braking apparatus according to claim 1, wherein the second engagement element is urged by a second engaging force so that the claw of the second engagement element maintains contact with the teeth of the first engagement element, and the second engaging force is small enough to allow the claw to climb over the teeth of the first engagement element when the first engagement element is driven by the motor in the brake applying direction.

3. An electric braking apparatus according to claim 2, wherein each tooth has an engaging face adapted to capture the claw of the second engagement element and an escape face adapted for the claw to climb over.

4. An electric braking apparatus according to claim 3, further comprising a stopper that holds the claw in place relative to the second engagement element while the claw climbs over the escape faces of the teeth.

5. An electric braking apparatus according to claim 1, further comprising an actuator that moves the second engagement element between a first position where the claw comes off the teeth of the first engagement element and a second position where the claw comes into engagement with the teeth.

6. An electric braking apparatus according to claim 5, wherein the actuator comprises a solenoid and a plunger magnetically driven by the solenoid.

7. An electric braking apparatus according to claim 5, wherein the actuator configured to forcibly move the second engagement element from the second position to the first position.

8. An electric braking apparatus according to claim 5, wherein the actuator configured to hold the second engagement element in the first and second positions.

9. An electric braking apparatus according to claim 8, wherein the actuator comprises a solenoid of self-holding type.

10. An electric braking apparatus according to claim 1, wherein the mechanism is configured to urge the friction members toward releasing the brake while the motor is deactivated.

11. An electric braking apparatus comprising:
an electric motor that is controlled in such a manner that it is activated to effectuate a parking brake and deactivated when the parking brake becomes in effect, whereas it is reversely activated to release the parking brake;
a mechanism that converts rotation of the motor into linear braking action of friction members to effectuate and release the parking brake and transfers brake reaction force back from the friction members while the parking brake is in effect;
a first engagement element being operably connected to the motor to move in a brake applying direction and a brake releasing direction, wherein the first engagement element is urged, while the parking brake is in effect, in the brake releasing direction by the brake reaction force transferred back from the friction members; and
a second engagement element being urged by an engaging force to engage with the first engagement element, wherein the engaging force is large enough to keep the second engagement element engaged with the first engagement element and hold the first engagement element in place against the brake reaction force urging the first engagement element in the brake releasing direction, thereby holding the parking brake in effect while the motor is deactivated, whereas the engaging force is small enough to allow the first engagement element to move relative to the second engagement element while keeping in contact therewith, when the first engagement element is driven by the motor in the brake releasing direction to release the parking brake,
wherein the first engagement element comprises teeth arranged on the first engagement element, and the second engagement element comprises a claw that engages with the teeth of the first engagement element.

12. An electric braking apparatus according to claim 11, wherein the second engagement element is urged by a second engaging force so that the claw of the second engagement element maintains contact with the teeth of the first engagement element, and the second engaging force is small enough to allow the claw to climb over the teeth of the first engagement element when the first engagement element is driven by the motor in the brake applying direction.

13. An electric braking apparatus according to claim 12, wherein each tooth has an engaging face adapted to capture the claw of the second engagement element and an escape face adapted for the claw to climb over.

14. An electric braking apparatus according to claim 13, further comprising a stopper that holds the claw in place relative to the second engagement element while the claw climbs over the escape faces of the teeth.

15. An electric braking apparatus according to claim 11, further comprising an actuator that moves the second engagement element between a first position where the second engagement element comes off the first engagement element and a second position where the second engagement element comes into engagement with the first engagement element.

16. An electric braking apparatus according to claim 15, wherein the actuator comprises a solenoid and a plunger magnetically driven by the solenoid.

17. An electric braking apparatus according to claim 15, wherein the actuator configured to forcibly move the second engagement element from the second position to the first position.

18. An electric braking apparatus according to claim 15, wherein the actuator configured to hold the second engagement element in the first and second positions.

19. An electric braking apparatus according to claim 18, wherein the actuator comprises a solenoid of self-holding type.

20. An electric braking apparatus according to claim 11, wherein the mechanism is configured to urge the friction members toward releasing the brake while the motor is deactivated.

* * * * *